UNITED STATES PATENT OFFICE.

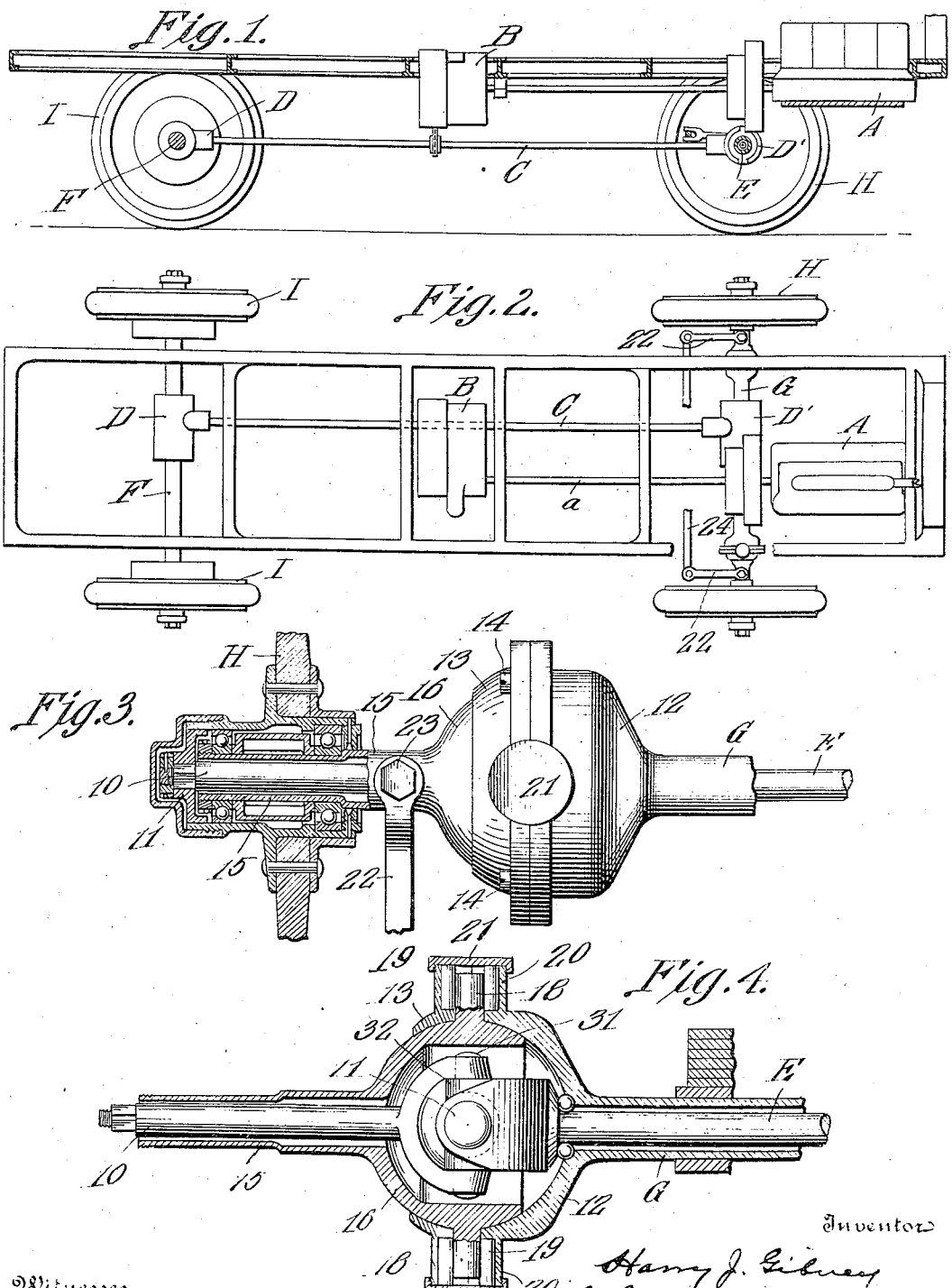

HARRY J. GIBNEY, OF BARTLESVILLE, AND EDWARD S. RAYDURE, OF DEWEY, OKLAHOMA.

DRIVE MECHANISM FOR MOTOR-VEHICLES.

1,200,721.   Specification of Letters Patent.   Patented Oct. 10, 1916.

Application filed March 1, 1915. Serial No. 11,346.

*To all whom it may concern:*

Be it known that we, HARRY J. GIBNEY, a citizen of the United States, residing at Bartlesville, Washington county, and State of Oklahoma, and EDWARD S. RAYDURE, a citizen of the United States, residing at Dewey, Washington county, and State of Oklahoma, have invented and discovered certain new and useful Improvements in Drive Mechanism for Motor-Vehicles, &c., of which the following is a specification.

Our invention relates to certain improvements in four-wheel-driven motor vehicles, the object being to provide improved means to enable the fore wheels to be coupled to and used with the other driving wheels to increase the traction power of the vehicle and, at the same time, leave them free to serve as the steering wheels therefor, the invention consisting chiefly in the novel construction and arrangement of parts of the devices permitting the wheel spindles to swing relatively to the driving axles, all as will be hereinafter more fully described and claimed.

Referring to the accompanying drawings which are made a part hereof, and on which similar reference characters indicate similar parts, Figure 1 is a longitudinal section through a truck, illustrating diagrammatically the application of our invention thereto, Fig. 2 a plan view thereof for the same purpose, Fig. 3 a detail plan view of one of the fore wheel driving spindles, the wheel hub being shown in section, and Fig. 4 a vertical sectional view through the universal coupling forming a part of the fore wheel axle.

In said drawings, the portions marked A represent the engine, B the transmission, C the main driving shaft, D, $D^1$ the differential gearings, E the fore driving axle, F the rear driving axle, G the fore axle casing, H the fore driving and steering wheels, and I the rear driving wheels.

The motor A, transmission B, driving shaft C, differentials D, $D^1$, fore wheels H, and rear wheels I, are in the main, or may be, of any common or approved construction and need no special description herein.

The fore axle E of the vehicle is formed with the outer ends carrying the wheel spindles as separate sections 10, connected to the ends of the main axle E by universal joint embodying pivots 11 and 31 extending at right angles to each other and coupling the two members through the medium of appropriate yokes formed on their respective ends and an intermediate coupling member 32, in a manner well understood. This joint may be formed as shown, or in any other suitable manner to permit the outer ends of sections 10 of the axle to be swung around relative to the axle E while said axle is being driven. Said axle is connected to be driven from the engine A through the engine shaft a, transmission B, driving shaft C, and differential gear $D^1$, in a manner which will be readily understood.

The axle casing G is formed at each end and immediately surrounding the universal joint between the main portion E of the axle and the end sections 10 with a hollow, cup-shaped socket member 12, the interior of which is semi-spherical in form. A detachable section 13, forming a continuation of the outer end of said cup-shaped member, is secured thereto by means of bolts or screws 14. The interior of the detachable member 13 forms a continuation of the interior of the part 12. The outer end of the axle casing consists of a member 15 having a hollow spherical member 16, which is adapted to fit within the interior of the members 12 and 13, forming a ball and socket joint. The outer end of member 15 extends to near the outer end of the axle and receives and supports the hub of the wheel H, which is attached to the end of axle E, as best shown in Fig. 3. The member 16 is retained in the socket 12 by means of the member 13, which is put in place after the members 12 and 16 are assembled, as will be readily understood. Studs 18 are formed on diametrically opposite sides of the ball member 15, forming vertical pivots which are mounted in suitable roller bearings 19, supported in housings 20 formed partly on member 12 and partly on member 13. Screw-caps 21 cover the outer ends of said housings 20, and also serve to securely support the bearings and couple the members 12 and 13 together.

A steering arm 22 is connected at 23 with each member 15 of the fore axle casing. Said steering arms are connected by a cross rod 24, which is connected with the steering gear (not shown) in the usual manner.

By the use of this construction of coupling, it will be seen that the application of the driving power to the fore axle of the vehicle, and the consequent increase of the traction power of the vehicle, may be secured without in any way interfering with the steering of the vehicle by means of the fore wheels by the usual steering means and in the ordinary manner. While this invention is especially applicable for a four-wheel-drive motor driven vehicle, it will also be found applicable in other classes of mechanism when similar couplings are advantageous.

Having thus fully described our said invention, what we claim as new and desire to secure by Letters Patent, is:—

In a fore-wheel drive and steering mechanism for motor-driven vehicles, the combination of an axle, an axle extension, a universal joint connecting said axle and axle extension, a casing surrounding the axle and constructed with a socket member, a hollow spindle surrounding the axle extension and constructed with a ball member fitted to said socket member, a ring secured to the socket member and retaining therein said ball member, said retaining ring and the socket member having their meeting faces located in the plane passing through the pivotal points of said universal joint, and constructed respectively with semi-circular bearing portions; pivot pins formed on said ball member fitting in said bearing portions and giving lateral turning movement to the axle extension, roller bearings for said pivot pins fitting in said bearing portions, and screw caps fitted on the ends of said bearing portions retaining said roller bearings and additionally securing said retaining ring.

In witness, whereof, we have hereunto set our hands and seals at Bartlesville, Oklahoma this 23rd day of February, A. D., nineteen hundred and fifteen.

HARRY J. GIBNEY. [L. S.]
EDWARD S. RAYDURE. [L. S.]

Witnesses:
S. E. BELL,
L. K. JUDY.